(12) United States Patent
Huang

(10) Patent No.: US 8,511,661 B2
(45) Date of Patent: Aug. 20, 2013

(54) POSITIONING FIXTURE ASSEMBLY

(75) Inventor: Da-Hai Huang, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 200 days.

(21) Appl. No.: 13/069,524

(22) Filed: Mar. 23, 2011

(65) Prior Publication Data

US 2012/0126470 A1 May 24, 2012

(30) Foreign Application Priority Data

Nov. 22, 2010 (CN) .......................... 2010 1 0553728

(51) Int. Cl.
*B25B 1/20* (2006.01)
*B25B 1/22* (2006.01)
*B23Q 3/00* (2006.01)

(52) U.S. Cl.
USPC ............... 269/74; 269/902; 269/43; 269/309; 269/310

(58) Field of Classification Search
USPC ............ 269/309, 310, 311, 43, 71, 902, 259, 269/266, 74; 29/281.1
See application file for complete search history.

(56) References Cited

U.S. PATENT DOCUMENTS 4,893,802 A * 1/1990 Lin .................................. 269/74
5,069,433 A * 12/1991 Womack ....................... 269/277

FOREIGN PATENT DOCUMENTS

CN 101596671 A 12/2009

* cited by examiner

*Primary Examiner* — Monica Carter
*Assistant Examiner* — Seahee Yoon
(74) *Attorney, Agent, or Firm* — Altis Law Group, Inc.

(57) ABSTRACT

A positioning fixture assembly includes a support member, a first clamping member, and a second clamping member. The support member includes a substantially cylindrical connecting portion and a supporting portion. A number of receiving grooves are defined in the connecting portion. The supporting portion includes a first surface. The first clamping member defines a first receiving slot and includes a first mounting surface and a first resisting surface. At least one projection projects from the bottom surface of the receiving slot. The connecting portion is received in the first and second receiving slots and is clamped by the first and second clamping members. The at least one projection is selectively received in the receiving grooves so that an angle is defined between the first surface and the first mounting surface.

11 Claims, 6 Drawing Sheets

POSITIONING FIXTURE ASSEMBLY

BACKGROUND

1. Technical Field

The disclosure generally relates to positioning fixture assemblies and, particularly, to an adjustable positioning fixture assembly.

2. Description of Related Art

Positioning fixture assemblies are widely used in manufacturing or assembling processes to hold or support workpieces. Conventional positioning fixture assemblies define a receiving space for securing a workpiece in place to conveniently cut or grind. When the workpiece has more than one surface to be machined, the positioning fixture assembly cannot easily be adjusted to provide a suitable angle for working on the workpiece Therefore, there is room for improvement within the art.

BRIEF DESCRIPTION OF THE DRAWINGS

Many aspects of the exemplary positioning fixture assembly can be better understood with reference to the following drawings. The components in the drawings are not necessarily drawn to scale, the emphasis instead being placed upon clearly illustrating the principles of the positioning fixture assembly. Moreover, in the drawings, like reference numerals designate corresponding parts throughout the several views, in which.

DETAILED DESCRIPTION

The disclosure is illustrated by way of example and not by way of limitation in the accompanying drawings. It should be noted that references to "an" or "one" embodiment in this disclosure are not necessarily to the same embodiment, and such references can include the meaning of "at least one" embodiment where the context permits.

Figure 1:
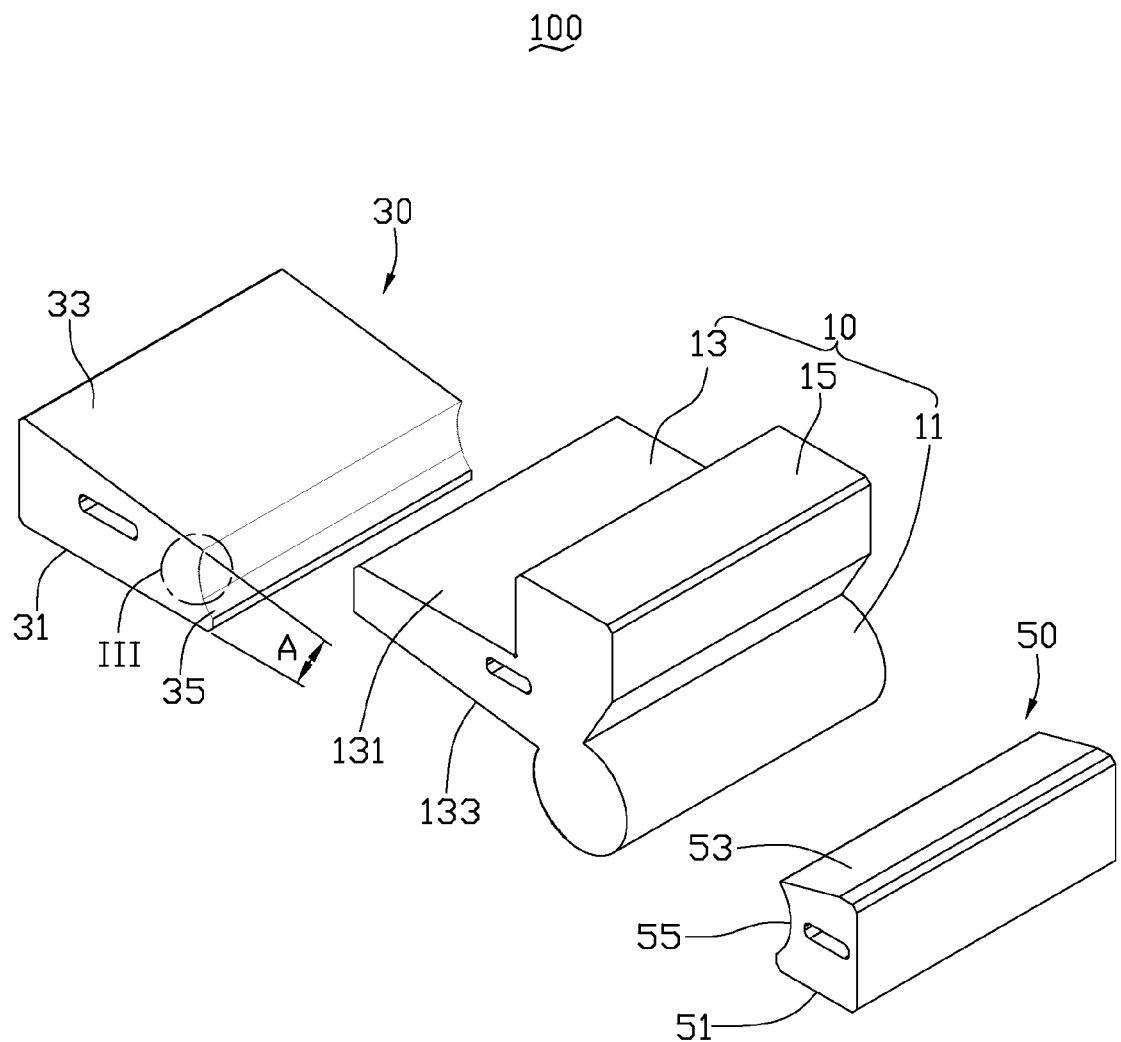
FIG. 1 is an exploded, isometric view of a positioning fixture assembly.
Figure 2:
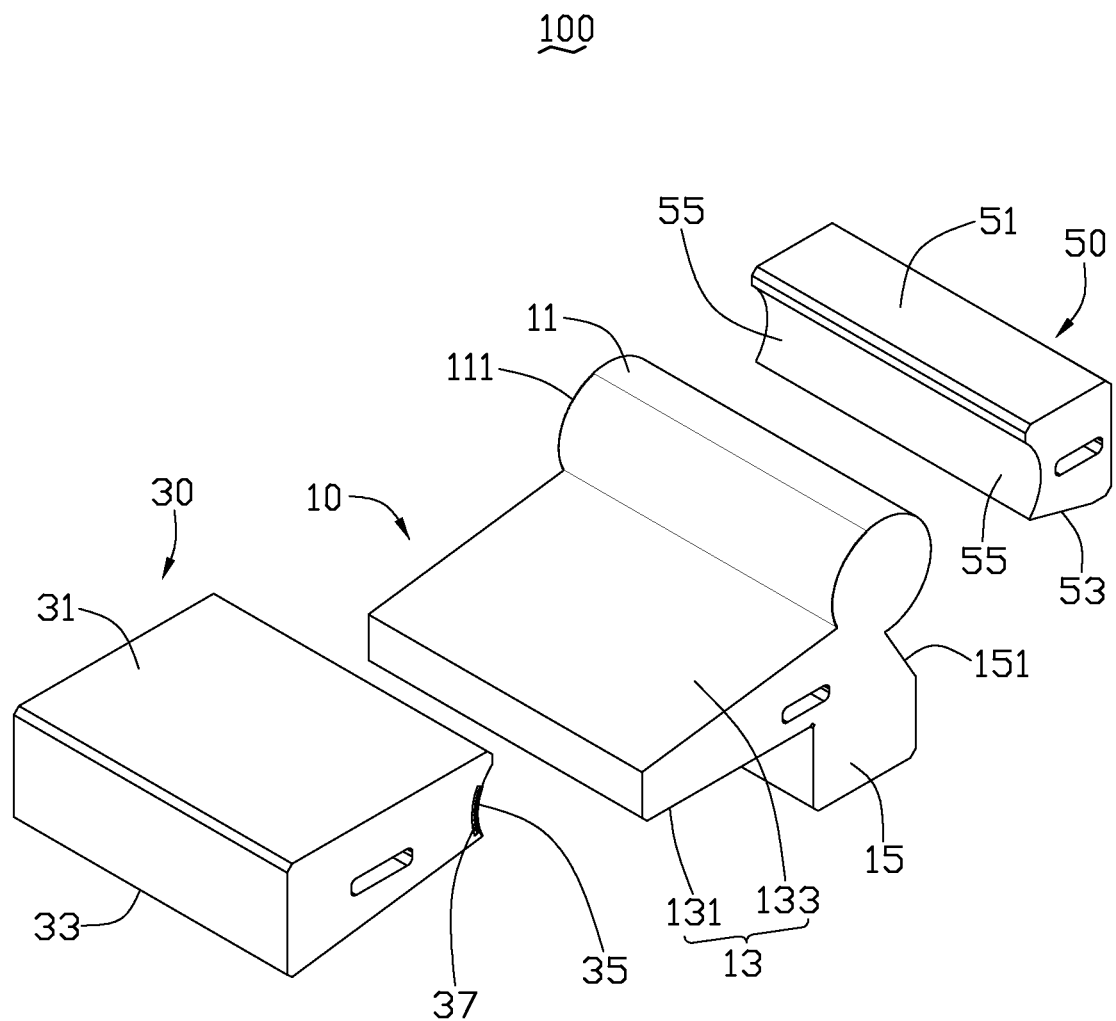
FIG. 2 is similar to FIG. 1, but viewed form another aspect.

FIG. 1 and FIG. 2 illustrate a positioning fixture assembly 100 to support a workpiece (not shown) during either a machining operation or other process. The positioning fixture assembly 100 includes a support member 10, a first clamping member 30, and a second clamping member 50. The first clamping member 30 and the second clamping member 50 are attached to a vice clamp (not shown) for clamping the support member 10. The support member 10 is used to load the workpiece and is rotatably retained between the first and the second clamping members 30 and 50.

The support member 10 includes a connecting portion 11, a support portion 13, and a flange portion 15. The connecting portion 11 and the flange portion 15 are positioned at opposite sides of the support portion 13. In the exemplary embodiment, the connecting portion 11 is substantially cylindrical. A number of receiving grooves 111 are defined in the surface of the connecting portion 11. The receiving grooves 111 are substantially parallel to each other and have substantially the same specifications. A first receiving slot 35 is defined in the first clamping member 30. A second receiving slot 55 is defined in the second clamping member 50. The connecting portion 11 is received in the first and second receiving slots 35 and 55.

The connecting portion 11 includes a first surface 131 and a second surface 133 opposite to the first surface 131. The first surface 131 is angled from the second surface 133 in a range from 0°-85°. The first surface 131 is for supporting the workpiece.

The first clamping member 30 includes a first mounting surface 31 and a first resisting surface 33. The first mounting surface 31 is for attaching the first clamping member 30 to the vice clamp. An angle A is defined between the first mounting surface 31 and the first resisting surface 33 in a range from 0°-85°. For example, the angle A may be 0°, 15°, 30°, 45°, 60°, 75°, and 85°. The first receiving slot 35 is defined in a sidewall between the first mounting surface 31 and the first resisting surface 33.

Figure 3:
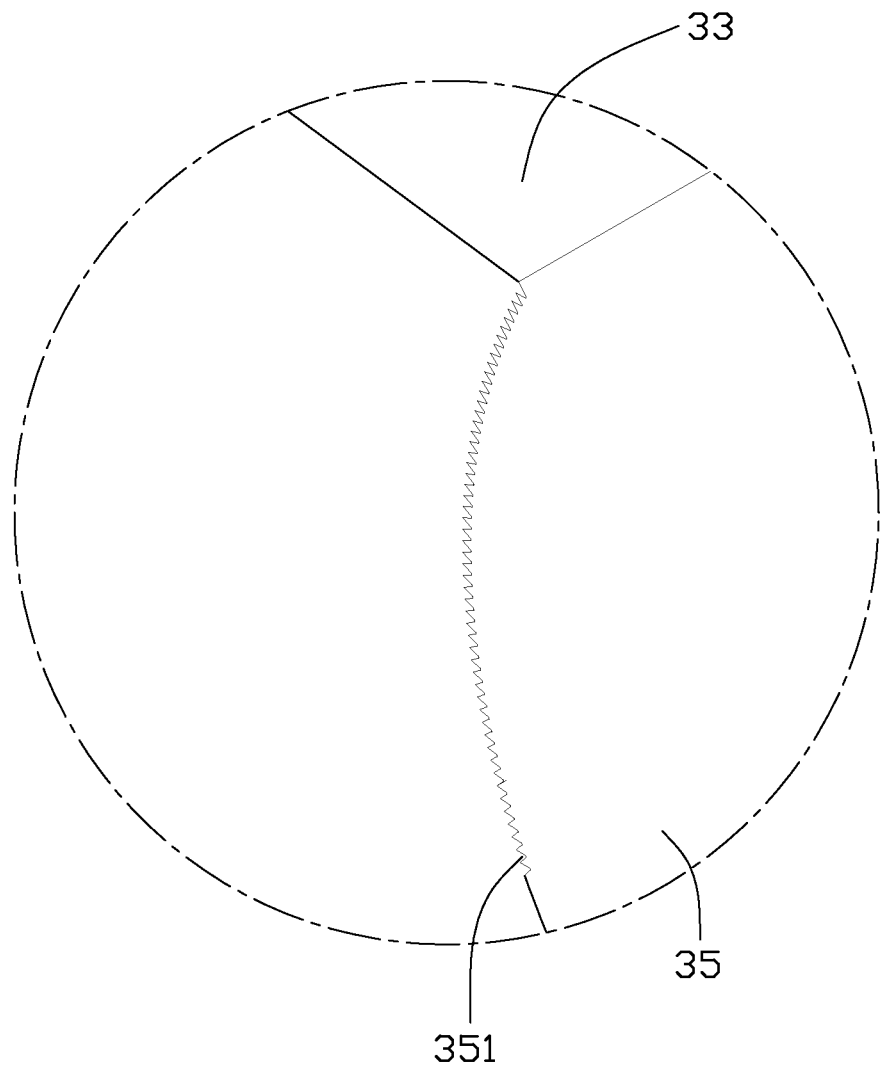
FIG. 3 is an enlarged view of circled portion III of FIG. 1.

Referring to FIG. 3, a number of projections 351 protrude from the bottom surface of the first receiving slot 35. The projections 351 are substantially parallel to each other and evenly spaced from each other. The projections 351 are selectively received in the corresponding receiving grooves 111 of the support member 10. The projections 351 are arranged in a saw-toothed pattern. An indicator 37 is positioned and labeled at one sidewall to identify an angle between the first mounting surface 31 and the first resisting surface 33.

The second clamping member 50 includes a second mounting surface 51 and a second resisting surface 53 opposite to the second mounting surface 51. The second mounting surface 51 is for attaching the second clamping member 50 to the vice clamp. The second mounting surface 51 is angled from the second resisting surface 53, and the angle can be varied according to the held workpiece.

During assembly, the first and the second clamping members 30 and 50 are attached to the vice clamp, and the first and the second mounting surfaces 31 and 51 resist the vice clamp. The connecting portion 11 of the support member 10 is located on the vice clamp between the first clamping member 30 and the second clamping member 50. The first clamping member 30 is pushed by the vice clamp to move towards the second clamping member 50. As the distance between the first and the second clamping members 30 and 50 decreases, the connecting portion 11 is received in the first and second receiving slots 35 and 55. The first clamping member 30 is further pushed towards the second clamping member 50, the projections 351 of the first clamping member 30 are selectively received in the corresponding receiving grooves 111 of the support member 10, and the connecting portion 11 is clamped by the first and second clamping members 30 and 50. Thus, the positioning fixture assembly 100 is assembled, as shown in FIG. 4.

Figure 4:
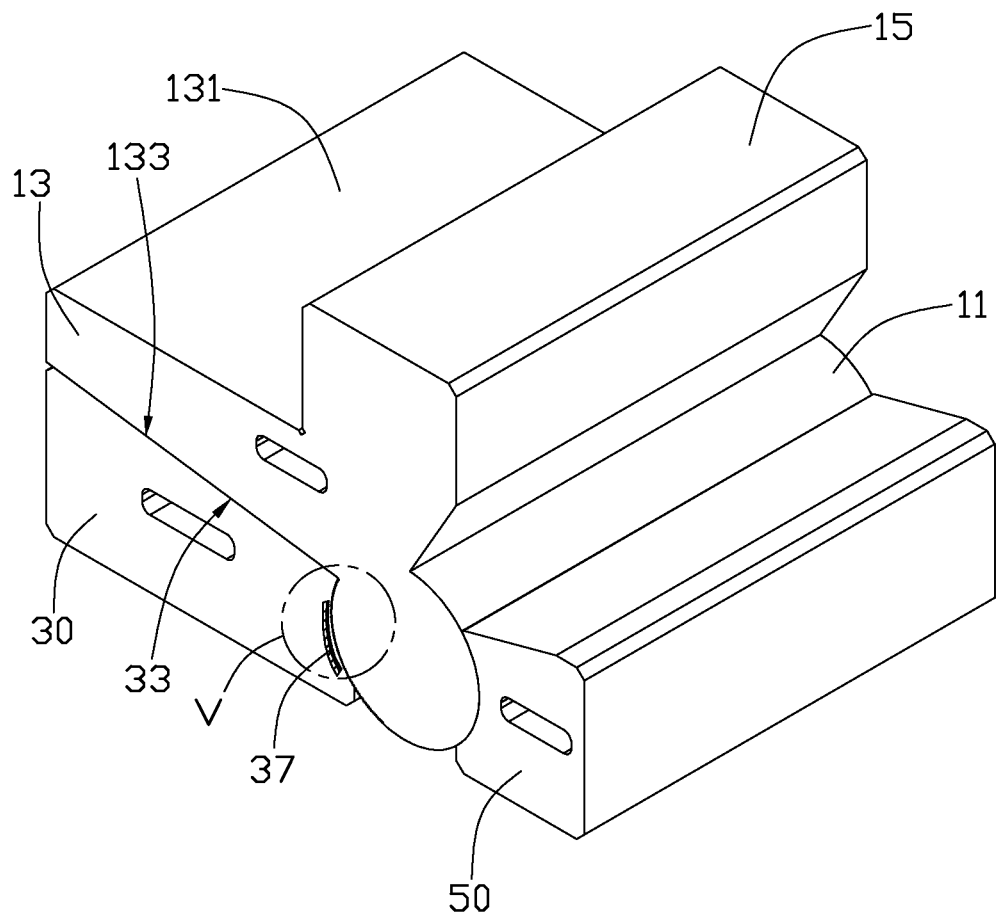
FIG. 4 is an assembled, isometric view of the positioning fixture assembly.

When the positioning fixture assembly 100 is in a state as shown in FIG. 4, the second surface 133 of the support member 10 resists the first resisting surface 33 of the first clamping member 30. The first surface 131 is substantially horizontal.

Figure 5:
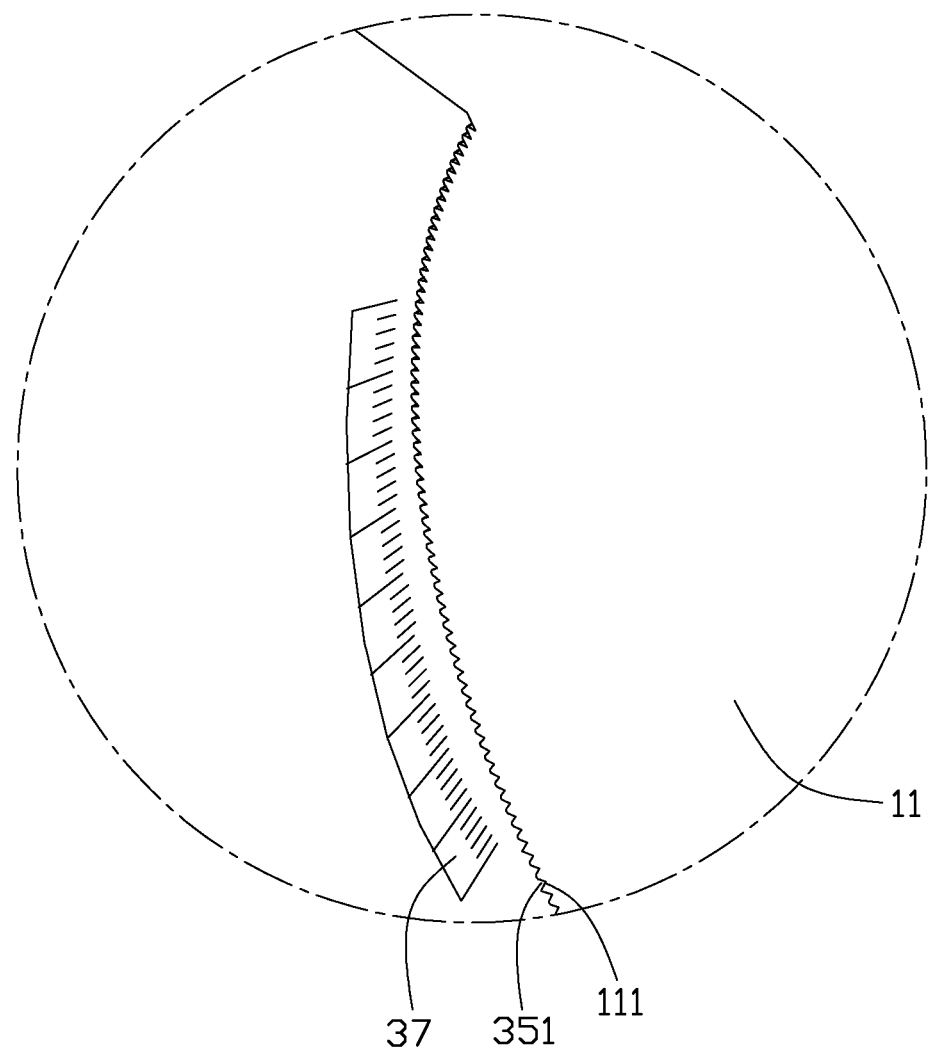
FIG. 5 is an enlarged view of circled portion V of FIG. 4.
Figure 6:
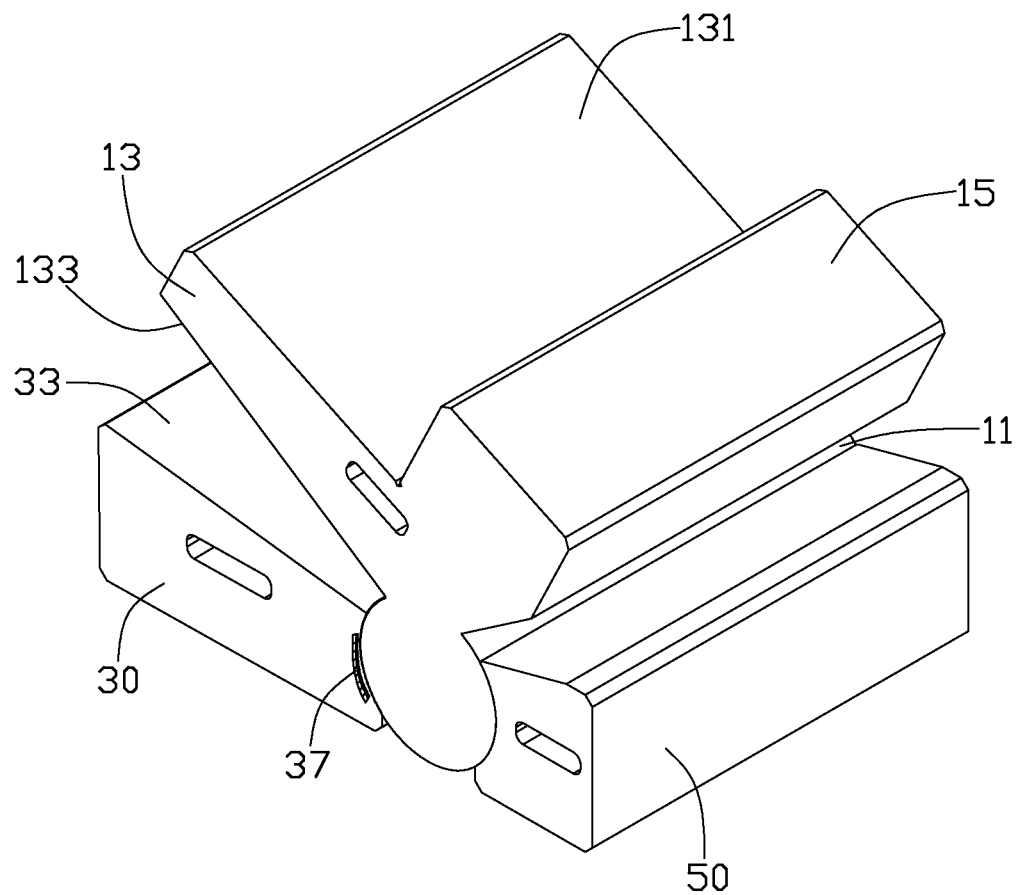
FIG. 6 is similar to FIG. 4, but showing the positioning fixture assembly in another state.

Referring to FIGS. 5 and 6, when the positioning fixture assembly 100 is used to support a workpiece during either a machining operation or other process, the first and second clamping members 30 and 50 are put on the vice clamp, and the support member 10 is put on the vice clamp between the first and the second clamping members 30 and 50. The projections 351 are selected to be received in the corresponding receiving grooves 111 so that a predetermined angle is defined between the second surface 133 of the support member 10 and the first mounting surface 31 of the first clamping member 30. The first clamping member 30 is pushed to move towards the second clamping member 50, and the connecting portion 11 is clamped by the first and the second clamping member 30 and 50. Thus, the workpiece can be loaded on the first surface 131 of the support member 10.

In the above exemplary embodiments, the projections 351 are selectively received in the receiving grooves 111, to form the angle between the first surface 131 and the first mounting surface 31 that best allows the workpiece attached to the first surface 131 to be held in a suitable orientation to be processed.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A positioning fixture assembly comprising:
   a support member comprising a connecting portion and a supporting portion, the connecting portion being substantially cylindrical, a plurality of receiving grooves defined in the connection portion, the supporting portion comprising a first surface and a second surface opposite to the first surface; and
   a first clamping member defining a first receiving slot, the first clamping member comprising a first mounting surface and a first resisting surface, at least one projection projecting in the receiving slot; and
   a second clamping member defining a second receiving slot, the second clamping member comprising a second mounting surface and a second resisting surface, the connecting portion received in the first and second receiving slots and clamped by the first and second clamping members, the at least one projection being selectively received in the receiving grooves;
   wherein when in a first state, the second surface of the support member contacts the first resisting surface of the first clamping member to allow the first surface to be horizontal;
   when in a second state, the second surface of the support member is spaced from the first resisting surface of the first clamping member to allow the first surface to be tilted.

2. The positioning fixture assembly as claimed of claim 1, wherein an angle defined between the first mounting surface and the first resisting surface is about 0-85°.

3. The positioning fixture assembly as claimed of claim 2, wherein the angle is 0°, 15°, 30°, 45°, 60°, 75°, or 85°.

4. The positioning fixture assembly as claimed of claim 2, wherein the support member further comprises a flange portion, the flange portion and the connecting portion are positioned at opposite sides of the supporting portion, when the angle is 85°, the flange resists the second clamping member.

5. The positioning fixture assembly as claimed of claim 1, wherein an indicator is positioned at one side wall of the first clamping member to read the angle between the first surface and the first mounting surface.

6. A positioning fixture assembly to support a workpiece, the positioning fixture assembly comprising:
   a support member comprising a connecting portion and a supporting portion, the connecting portion being substantially cylindrical, a plurality of receiving grooves defined in the connection portion, the supporting portion comprising a first surface to support the workpiece and a second surface opposite to the first surface; and
   a first clamping member defining a first receiving slot, the first clamping member comprising a first mounting surface and a first resisting surface, a plurality of projection projecting in the receiving slot; and
   a second clamping member defining a second receiving slot, the second clamping member comprising a second mounting surface and a second resisting surface, the connecting portion received in the first and second receiving slots and clamped by the first and second clamping members, the projections being selectively received in the receiving grooves so that the workpiece is positioned at a predetermined position;
   wherein when in a first state, the second surface of the support member contacts the first resisting surface of the first clamping member to allow the first surface to be horizontal;
   when in a second state, the second surface of the support member is spaced from the first resisting surface of the first clamping member to allow the first surface to be tilted.

7. The positioning fixture assembly as claimed of claim 6, wherein an angle is defined between the first mounting surface and the first resisting surface, the angle is about 0-85°.

8. The positioning fixture assembly as claimed of claim 7, wherein the angle is 0°, 15°, 30°, 45°, 60°, 75°, or 85°.

9. The positioning fixture assembly as claimed of claim 7, wherein the support member further comprising a flange portion, the flange portion and the connecting portion are positioned at opposite sides of the supporting portion, when the angle is 85°, the flange resists the second clamping member.

10. The positioning fixture assembly as claimed of claim 6, wherein an indicator is positioned at one side wall of the first clamping member to read the angle between the first surface and the first mounting surface.

11. The positioning fixture assembly as claimed of claim 6, wherein the projections are saw-toothedly arranged.

* * * * *